United States Patent
Sieckmann et al.

(10) Patent No.: US 7,924,027 B2
(45) Date of Patent: Apr. 12, 2011

(54) ARRANGEMENT FOR DETERMINING THE DISTANCE, CAPACITIVE DISTANCE SENSOR AND METHOD FOR AUTOMATICALLY FOCUSSING A MICROSCOPE

(75) Inventors: Frank Sieckmann, Bochum (DE); Reiner Rygiel, Altrip (DE)

(73) Assignee: Leica Microsytems CMS GmbH, Wetzlar (DE)

( * ) Notice: Subject to any disclaimer, the term of this patent is extended or adjusted under 35 U.S.C. 154(b) by 631 days.

(21) Appl. No.: 11/855,752

(22) Filed: Sep. 14, 2007

(65) Prior Publication Data

US 2008/0068028 A1  Mar. 20, 2008

(30) Foreign Application Priority Data

Sep. 15, 2006 (DE) .................. 10 2006 044 235

(51) Int. Cl.
*G01R 27/26* (2006.01)
(52) U.S. Cl. ...................................... 324/662
(58) Field of Classification Search .................. 324/662
See application file for complete search history.

(56) References Cited

U.S. PATENT DOCUMENTS

| | | | |
|---|---|---|---|
| 6,534,973 B1 | 3/2003 | Spoerl et al. | |
| 6,801,650 B1 * | 10/2004 | Kikuchi et al. | 382/145 |
| 2002/0067477 A1 * | 6/2002 | Morita et al. | 356/237.5 |
| 2004/0169915 A1 * | 9/2004 | Yoneyama et al. | 359/368 |

FOREIGN PATENT DOCUMENTS

| | | |
|---|---|---|
| DE | 27 11 925 | 9/1977 |
| DE | 197 33 297 A1 | 2/1999 |
| DE | 199 11 958 A1 | 10/2000 |
| DE | 100 59 232 A1 | 6/2002 |
| DE | 102 44 619 A1 | 4/2004 |

OTHER PUBLICATIONS

German Office Action dated Aug. 28, 2007 including English translation of the relevant portion (Six (6) pages).
German Office Action dated Sep. 17, 2008 (2 pages).

* cited by examiner

*Primary Examiner* — Amy He
(74) *Attorney, Agent, or Firm* — Crowell & Moring LLP

(57) ABSTRACT

An arrangement and method are provided for determining the distance between an objective of a microscope and a sample examined with the microscope. Fitted on the objective or in the immediate vicinity of the objective is a capacitive sensor in whose measuring range the sample and/or a microscope slide supporting the sample is located or into which it can be brought. The sample and/or the slide causing a measurable change in the capacitance of the sensor. From the change in the capacitance of the sensor, the distance of the sample and/or of the microscope slide from the sensor is determined, and thus the distance of the sample from the objective. A capacitive distance sensor can be applied in such an arrangement by which a stray field can be generated between at least two electrodes. The capacitance experiences a measurable change owing to an object introduced into the stray field. The electrodes of the sensor are arranged as substantially coaxial lateral surfaces. The electrodes are designed such that the sensor can be plugged onto the objective of the microscope, the lateral surfaces at least partially enclosing and touching the objective.

6 Claims, 11 Drawing Sheets

ARRANGEMENT FOR DETERMINING THE DISTANCE, CAPACITIVE DISTANCE SENSOR AND METHOD FOR AUTOMATICALLY FOCUSSING A MICROSCOPE

BACKGROUND AND SUMMARY OF THE INVENTION

This application claims the priority of German Application No. 10 2006 044 235.0, filed Sep. 15, 2006, the disclosure of which is expressly incorporated by reference herein.

The invention relates to an arrangement for determining the distance between an objective of a microscope and a sample examined with the microscope. The invention further relates to a capacitive distance sensor by which a stray field can be generated between at least two electrodes, and whose capacitance experiences a measurable change owing to an object introduced into the stray field. Also, the subject matter of the invention is a method for automatically focussing a microscope.

The task frequently arises in microscopy of suitably determining the distance of a microscope objective from a sample examined with the microscope. This represents a central task particularly in the case of systems with automatic focussing. In this case, the distance between the objective and sample is set automatically in such a way that the microscope can obtain a sharp image of the sample.

In addition, there is a need for distance measurements in order to protect samples and a microscope slide supporting the sample from being destroyed. Such destruction can be initiated by mechanical contact of the objective with the sample or the microscope slide. For example, in the case of fluorescence preparations, the focussing plane can be determined only with difficulty owing to the often weak signals. Here, and in comparable situations, when searching for the focus the operator can easily inadvertently move the objective or the microscope stage far to the front in such a way that mechanical contact is produced between the objective and sample or microscope slide. This has the effect that the microscope slide bends or breaks, or that the sample is destroyed in some other way. Expensive samples or even unique preparations can thereby be destroyed. If a preparation is toxic, the operator is additionally thereby endangered. It is therefore well worth striving for distance measurements and warning systems based thereon.

A very wide variety of autofocus systems are known from practice. These are subdivided essentially into image-based methods and methods that are not image-based. In the case of image-based methods, the sharpness of the microscopic image recorded by a camera or a camera system is evaluated. To this end, a frame grabber is used in an analysis computer. The images recorded via the frame grabber are mostly reduced to grey-scale images of 8 bit color depth. Thereafter, edge filters are applied to the images. If an image is in focus, this is very clearly evident in the camera image. If no sufficiently sharp edge can be detected in the filtered image, the distance between the objective and sample is adapted by a certain amount, an image is recorded anew, and the edges are detected in the image. It is possible to determine a focal position in this way as a function of the distance.

Image-assisted autofocus methods certainly deliver comparatively good results for the focussing, but the quality of the focussing is very greatly dependent on the quality of the images. If, for example in the case of fluorescence microscopy, it is possible to obtain only comparatively weak contrast images of the sample, autofocussing with the aid of this method is possible only with great difficulty or not at all. Furthermore, difficulties arise when not only a single focal position exists. In the event of the existence of a number of focal positions, ambiguities arise, which must be suitably evaluated.

By contrast, autofocus methods, which are not image-based, are independent of image properties. These mostly serve as a reference point, which is used to determine the distance. A reflecting reference point at the surface of the microscope slide, for example, comes into question for this purpose. A monochromatic or polychromatic reference light or reference laser beam illuminates the reference point, is reflected thereat, directed into one or more photo cells, and detected there. It is possible to infer the distance between the light source or laser and the surface by transit time measurement. Other methods use chromatic aberration in order to focus a polychromatic light beam onto a number of points at different distances from the light source. The light beam which was focused onto the reference point can be filtered out of the reflected light beam. It is likewise possible in this way to infer a distance.

Whether image-based or not—known autofocus methods have the problem that substantial costs accrue owing to the equipment required in addition. Particularly in the case of laser-assisted autofocus systems, the additional problem arises that operators of the microscope must be protected against the influence of laser light. These additional costs cannot be borne in the case, for example, of the design of a system for protecting the sample or a microscope slide against destruction. The aim here is merely to warn the operator against too short a distance, and so costs in the range of several thousands of euros are not accepted. In addition, the known methods are mostly comparatively slow, and so an operator can be warned quickly only with difficulty. Furthermore, there is the problem that the known systems are influenced strongly by slight soiling of the sample carrier. Thus, for example, dust grains have an extremely negative effect on image-based methods.

The present invention is, therefore, based on the object of configuring and further developing an arrangement of the type mentioned above in such a way as to enable quick and precise determination of the distance between the objective and sample or microscope slide in conjunction with low costs and with as simple a design as possible. A suitable sensor is additionally to be specified to this end. A corresponding autofocus method is to be specified.

This, and other objects are achieved according to the invention by an arrangement for determining the distance between an objective of a microscope and a sample examined with the microscope configured such that fitted on the objective or in the immediate vicinity of the objective is a capacitive sensor in whose measuring range the sample and/or a microscope slide supporting the sample are/is located, or can be brought therein, the sample and/or the microscope slide causing a measurable change in the capacitance of the sensor. It is possible to determine from the change in the capacitance of the sensor the distance of the sample and/or of the microscope slide from the sensor, and thus the distance of the sample from the objective.

It has firstly been recognized in the way of the invention that expensive and complicated image-based methods, or expensive optical methods, for example using laser light, can be dispensed with. Instead, capacitive sensors can be used in a particularly simple way. These sensors generate a stray field which is influenced by materials or liquids entering the measuring range of the sensor. A nonconductor approaching the sensor has the effect that an increase in the capacitance of the sensor can be detected as a consequence of the relative dielectric constant, which has been increased in relation to air.

According to the invention, these effects can also be used in conjunction with microscopy. To this end, a capacitive sensor is fitted on the objective or in the immediate vicinity of the objective. In this case, the sensor is arranged such that the sample and/or a microscope slide supporting the sample are/is located in the measuring range of the sensor. Alternatively, the sensor can also be swivellably configured such that the sample or the microscope slide enters the measuring range of the sensor only after swivelling. The sample and/or the microscope slide cause a measurable change in the capacitance of the sensor as a function of the distance from the sensor. The distance of the sample and/or of the microscope slide from the sensor can be inferred in a very simple way from the change in capacitance. The distance of the sample from the objective can, in turn, be determined therefrom. A particularly simple and cost effective measurement of the distance between the sample and objective can be implemented in this way. A satisfactory measuring range can be covered, given suitable dimensioning of the electric fields emitted by the sensor, and it is possible at the same time to prevent destruction of the sample as a consequence of the charges induced in the sample.

The distance of the sensor from the sample can advantageously be assigned with particular accuracy to a distance of the sample from the objective whenever the sensor is suitably fitted. This can be achieved when a fixed, or at least defined, spatial relationship exists between the sensor and the objective. This presupposes that the position and orientation of the objective can always be uniquely inferred given a known position and orientation of the sensor. This is mostly possible whenever the fastening of the sensor is designed to be sufficiently flexurally stiff and stable. However, a defined spatial relationship can also exist whenever—for example in the case of a swivellable sensor—it is possible to assume a measuring position which is uniquely defined or can be determined with sufficient accuracy.

The sensor could be connected in this case directly to the objective. This could be achieved by plugging, bonding or welding the sensor onto the objective. Other types of connection can also be used, in addition. Thus, the sensor could be pushed onto the objective and secured with a bayonet lock, or screwed onto the objective. All methods known from practice are available to this end. However, it should be ensured that the position and orientation of the sensor is sufficiently fixed or defined with reference to the objective. Thus, the connection should, for example, be designed in such a way that at most a slight play arises between the sensor and objective.

In addition, the sensor could be fitted by use of a holding device. This holding device can be designed in various ways. Thus, it will be possible to use a relatively arbitrary section from a metal sheet on which the sensor is fastened. However, it would also be possible to use rod-shaped holding devices produced from relatively arbitrary profiles. The fastening on the holding device can be achieved in various ways. It is likewise possible to use a plug connection such as a bonded, welded or screwed connection. The application will decide here what type of holding device or connection of the sensor on the holding device is sensible.

The holding device itself could firstly be fastened on the objective. It could thereby be achieved that a particular distance between the objective and sensor is possible, and that a possible soiling of the sensor is thereby precluded. Alternatively, or in addition, the holding device could be fitted on an objective revolver of the microscope. The connection between the holding device and objective revolver could, in turn, be produced in various ways. For example, the holding device could be bonded on or be screwed on the objective revolve by use of screws. Once again, all fastening methods known from practice are available here.

Alternatively, a holder of an objective revolver of the microscope could also serve for fastening the sensor. Since sometimes not all the holders available in the objective revolver are used, one holder might not be fitted with an objective. Instead of this, the sensor could be plugged or screwed into the holder. In order to determine the distance between the sensor and sample, the objective revolver would then be rotated in such a way that the sensor is directed towards the sample. Once a desired distance is set, the objective revolver would be rotated to the desired objective and the microscopy operation would be begun or continued.

In order for the sensor to be able to generate an electric stray field, the sensor must be suitably supplied with energy via a voltage source. To this end, the voltage source generates a DC voltage or an AC voltage. However, it is also possible to supply the sensor with the aid of a DC voltage superposed with AC voltage. Various methods and devices are known from practice for feeding the sensor. For example, the voltage could be coupled into the sensor via a coupling resistor. Since the capacitance of the sensor is to be determined during operation of the arrangement, feeds with AC voltages mainly turn out to be particularly sensible. The determination of the capacitance could then be done, for example, via a measuring bridge.

However, an inductor is preferably connected to the sensor so as to form a resonant circuit from the sensor and the inductor. It is possible in this case to make particularly effective use mostly of parallel circuits of sensor and inductor.

The resonant circuit produced in such a way has a resonant frequency defined by the inductance and the capacitance value. The feeding of the resonant circuit could then be performed such that a regulating circuit corrects the frequency continuously. In this process, the frequency of the voltage source could be held substantially at the resonant frequency of the resonant circuit. It is possible, thereby, in a simple way to ascertain the capacitance of the sensor directly from the frequency of the voltage generated by the voltage source. If, in addition, the frequency is set digitally, an analog-digital conversion could be eliminated in a simple way.

A distance value could be assigned to the capacitance value of the sensor as measured or as determined in another way. This could be performed by a suitable evaluation circuit. Analog circuits can be used in this case just as can digital circuits. However, it is preferred to use digital circuits based on microprocessors, such as microcontrollers, digital signal processors, or the like. In this case, the capacitance value can be assigned to a distance value with particular ease and flexibility. In particular, any desired adaptations to various operating conditions can be carried out.

The connection of the sensor to the evaluation circuit could be implemented in various ways. Thus, a cabled transmission method could be used. It is possible here to use two-wire techniques just as the four-wire connections known from metrology. Metrology also proffers various possibilities regarding the selection of the cables used. Reference may be made purely by way of example to the use of twisted wires or coaxial cables.

Alternatively, the signals could be transmitted from the sensor to the evaluation circuit in a wireless fashion. This would be advantageous to the effect that, for example, no cables prevent any desired rotation when the microscope objective revolver is being rotated. Various analog or digital transmission methods are available for wireless transmission.

Reference may be made purely by way of example to the use of infrared signals, Bluetooth, WLAN (wireless local area network), or other radio techniques.

An electronic unit with a further electronic circuit could be provided on the sensor or in the immediate vicinity of the sensor in the case of both cabled and cableless transmission methods. This circuit could carry out the measurement of the capacitance of the sensor and condition the measured capacitance values for transmission to the evaluation circuit. This conditioning could consist, for example, in amplification, linearizing, analog-to-digital conversion or suitable coding. The electronic circuit could then also already include a voltage source for feeding the sensor and any possibly required regulating circuits for regulating the voltage source.

The electronic circuit itself could be supplied with energy in various ways. Thus, it would be possible to provide a battery or a rechargeable battery which is fitted in the immediate vicinity of the circuit. Alternatively, a cabled supply could be provided. This could, for example, be passed on via sliding contacts. Inductive energy couplings could also be used.

Even though the previous statements are limited to the use of an individual sensor for determining the distance between the objective and sample, it is nevertheless also possible to use a number of sensors in parallel. Thus, for example, three sensors can be arranged in a plane. If the plane is orientated at right angles to the optical axis of the objective, the position of the sample with reference to the objective can be uniquely inferred from the distance measurement values of the individual sensors. The number of the sensors used, and the type of arrangement are not limited in principle. Here, in turn, the application must decide what number of sensors is sensible and desirable. In most cases, spatial restrictions, above all, will restrict the number of sensors.

The determination of the distance between an objective and an object can be undertaken with particular ease and in a space-saving fashion whenever a capacitive distance sensor in accordance with a further aspect of the invention is used. In accordance therewith, the distance sensor under discussion is characterized in that the electrodes are arranged as substantially coaxial lateral surfaces, and in that the electrodes are designed in such a way that the sensor can be plugged onto the objective of a microscope, the lateral surfaces at least partially enclosing and touching the objective.

It has been realized here in accordance with the invention that a sensor is particularly favorably configured for determining the distance between an objective and a sample examined therewith when the sensor can be plugged directly onto the objective. This can be achieved with particular ease according to the invention when the electrodes of the sensor are arranged as substantially coaxial lateral surfaces. When these lateral surfaces are additionally designed such that they at least partially enclose and simultaneously touch the objective, the sensor can be plugged onto the objective. To this end, the lateral surfaces should enclose the objective over a sufficiently large area to ensure an adequately stable positioning and orientation of the sensor on the objective.

At least the electrode lying nearest the objective could be modeled on the shape of the objective with regard to a particularly stable and precise fitting of the sensor on the objective. An adequate stability of the sensor could be achieved in this way given suitable points of contact between the sensor and objective. It would be possible in this case for the electrode of the sensor, which lies nearest the objective, to touch the objective in a form-fitting fashion. It is thereby possible to achieve a particularly optimal contact and a high local stability of the sensor with reference to the objective.

The inventive sensor could be applied to the objective in a force-closed fashion. Alternatively, a comparatively arbitrarily configured material could be introduced between the sensor and objective. This could, for example, be an adhesive, or else a layer made from rubber, plastic or the like could separate the inner electrode of the sensor from the objective. This would have the advantage that the sensor and the objective are galvanically separated from one another.

In order to avoid soiling of the region between the electrodes of the sensor, the latter could be sealed with a nonconductive material at least one of the edges of the electrodes. In a particularly advantageous way, the edges of the electrodes which lie nearest the observed sample are sealed in this case. This material for sealing the inner space between the electrodes additionally increases the stability of the sensor arrangement.

The interspace between the electrodes could be filled partially or completely with a nonconducting material as a dielectric in order to further stabilize the sensor. This could, for example, include a resin cast between the electrodes. The electrodes would thereby be held at a defined and constant spacing. Moreover, the sensor would be stabilized against mechanical loading.

With regard to a particularly sensible application of the sensor, the electrodes could be arranged in such a way that the stray field generated by the sensor is substantially produced in a region around the optical axis of the objective. Given a suitable configuration of the electrodes, it is thereby possible to determine the distance from a region of real interest. Regions which lie remote from the optical axis are then substantially left out of account.

Apart from the outer and the inner electrodes, the sensor can additionally have further electrodes with which the shape of the stray field is influenced. Thus, it is possible to arrange between the two electrodes on the edge facing the sample a screening electrode, which forces the stray field into the region in front of the sensor. A voltage can, in turn, be applied to the additional electrodes. It would also be possible in this way to influence the penetration depth of the stray field into the region in front of the sensor, and control it if required.

A method for automatically focussing a microscope is also provided according to the invention. In accordance therewith, the method includes the following acts:

(a) measuring the capacitance of a capacitive sensor that is fitted on an objective of the microscope and in whose measuring range there are/is located a sample examined with the microscope and/or a microscope slide supporting the sample;

(b) comparing the measured capacitance with a reference value;

(c) determining the distance of the sensor from the sample or the microscope slide from the result of the comparison;

(d) determining the distance of the objective from the sample or the microscope slide (actual distance) from the distance of the sensor;

(e) comparing the actual distance with a desired distance between objective and sample; and (f) varying the distance between the objective and sample by an amount determined by means of the result of comparison.

In a first step, the capacitance of a capacitive sensor is measured. The sensor is fitted in a suitable way on an objective of the microscope such that the distance of the objective from a sample can be inferred in a suitable way from the distance of the sensor from a sample. The sample, which is being examined by the microscope, and/or a microscope slide supporting the sample, are/is arranged in the measuring range of the sensor, or can at least be brought therein.

In a next step, the measured capacitance of the sensor is compared with a reference value. Given the presence of the sample or the microscope slide, this comparison yields a deviation, which in general represents an increase in the capacitance and which depends on the distance between the sensor and sample or microscope slide. In a next step, the distance of the sensor from the sample or the microscope slide is determined from the change in capacitance, since the sensor is fitted on the objective such that the distance of the objective from the sample or the microscope slide can be inferred from the distance of the sensor from the sample or the microscope slide. This actual distance is compared in a next step with a desired distance between objective and sample. If the actual distance deviates from the desired distance, the distance between the objective and sample is varied by a specific amount. This is performed generally by displacing the objective towards the sample or away from the latter, or by moving the microscope stage on which the sample or the sample carrier is lying.

For the purpose of making the measurement results more precise, it would be possible to use knowledge relating to the nature of the sample and/or of the microscope slide. The capacitance of the sensor is influenced with different intensity by different materials. Thus, the relative dielectric constant of an nonconducting material is decisive in the case of such a material. This depends on the nature of the material. Thus, for example, glass, from which microscope slides are mostly formed, has a relative dielectric constant of 6 to 8. Water, by contrast, in which the sample is floating, for example, has a relative dielectric constant of approximately 80. If, for example, ceramic constituents are present in the sample, the dielectric constant can reach an order of magnitude of several hundred thousand. This incomplete and purely exemplary listing shows that the distance of the objective from the sample cannot be inferred necessarily and straight away from a change in capacitance. In general, however, sufficient knowledge relating to the nature of the sample and/or of a microscope slide is present such that it is possible to reduce the uncertainty and even to remove it entirely. This knowledge essentially includes the materials belonging to the sample and/or the microscope slide. It is, thereby, possible to achieve measuring accuracies as far as well below a micrometer and, in part, even into the range of nanometers.

The capacitance of the sensor, which is set without the influence of the sample and/or of the microscope slide, comes into use as reference value when comparing the measured capacitance. These reference values can be found, for example, by calculations, simulations or calibration measurements. The calibration measurements are advantageously carried out on a sensor already fitted on the objective.

In order to set a correct distance between the objective and the sample or the desired focal plane, this focal plane could still be suitably determined. Alternatively, the user of the system could define a desired focal plane. The autofocus system can then set the focal plane suitably by varying the distance between the objective and sample.

All aspects of this invention can advantageously be used irrespective of the microscope used and of the microscopy method used. Purely by way of example, reference may be made to the application in conjunction with transmitted-light, fluorescence or confocal microscopy. All that is essential to the application is that a distance can be measured and is possibly of interest for the microscopy used.

The inventive arrangement and the inventive sensor can be used in a particularly advantageous way to build up a system which can operate virtually in real time. Since no complicated evaluations of images are required, the processing of the measured capacitance values can be undertaken very quickly. The distance values are therefore available very quickly.

There are various possibilities for configuring and developing the teaching of the present invention in an advantageous way. Reference is made to the following explanation of preferred exemplary embodiments of the invention with the aid of the drawings. Again, generally preferred refinements and developments of the teaching are explained in conjunction with the explanation of the preferred exemplary embodiments of the invention with the aid of the drawings.

DETAILED DESCRIPTION OF THE DRAWINGS

Figure 1:
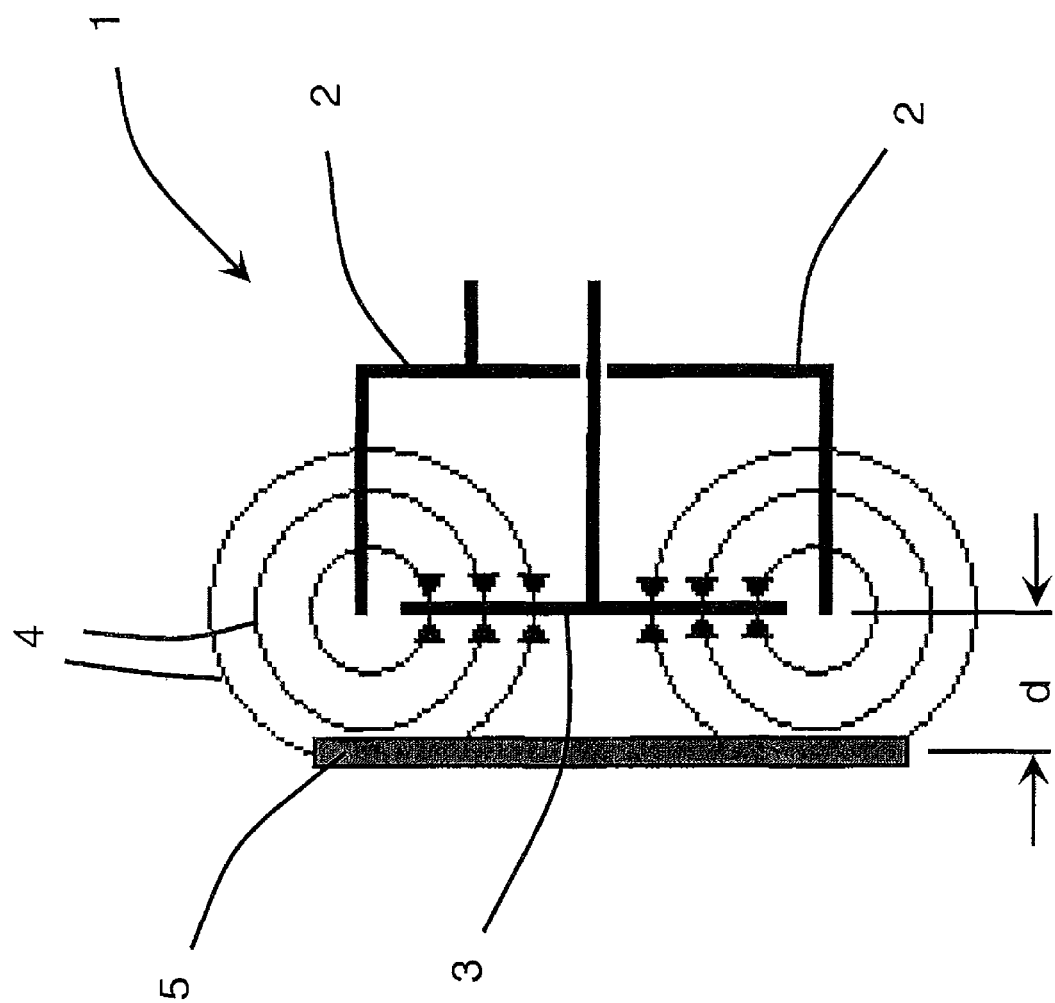
FIG. 1 shows the functional principle of an inventive distance sensor.

FIG. 1 shows a section through a distance sensor, and is intended to illustrate the functional principle of such a sensor. The distance sensor 1 includes an outer electrode 2 and an inner electrode 3, between which an electric stray field is formed. Individual field lines 4 of this stray field are illustrated in FIG. 1 schematically. An object 5 is located at a distance d from the sensor 1. Irrespective of whether the object 5 includes a conductor or a nonconductor, the object 5 will influence the capacitance of the sensor as a function of the distance d. This change in the capacitance can be detected by a suitable measuring and evaluation circuit and be assigned to the distance d.

Figure 2:
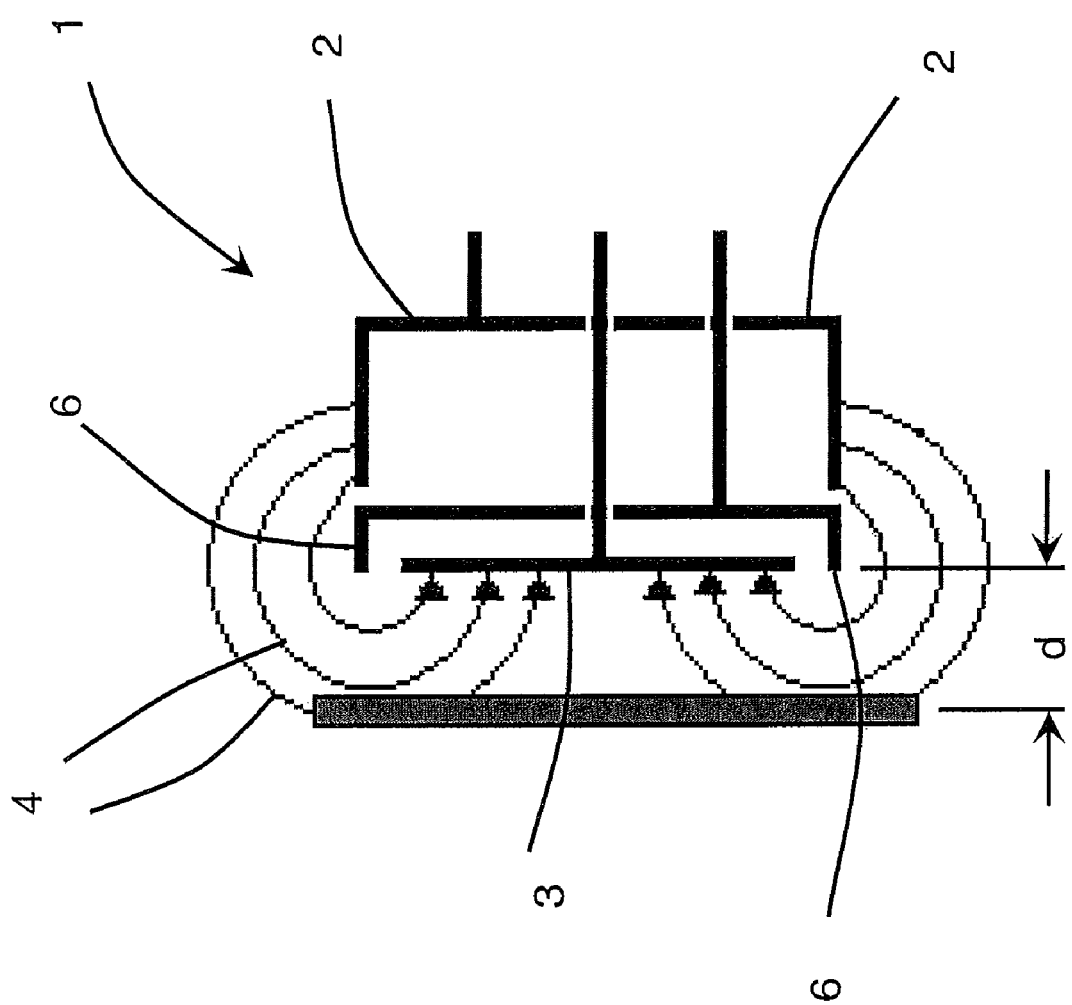
FIG. 2 shows the functional principle of an inventive distance sensor having a screening electrode.

FIG. 2 likewise shows the functional principle of an inventive distance sensor which, however, has a screening electrode 6 in addition to the components of the distance sensor from FIG. 1. A stray field whose field lines 4 are indicated in FIG. 2 is likewise formed between the electrodes 2 and 3 when a voltage is applied to the sensor. However, by contrast with the field lines from FIG. 1, the field extends in the outer region of the sensor, whereas essentially no field lines are formed in the interior.

Figure 3:
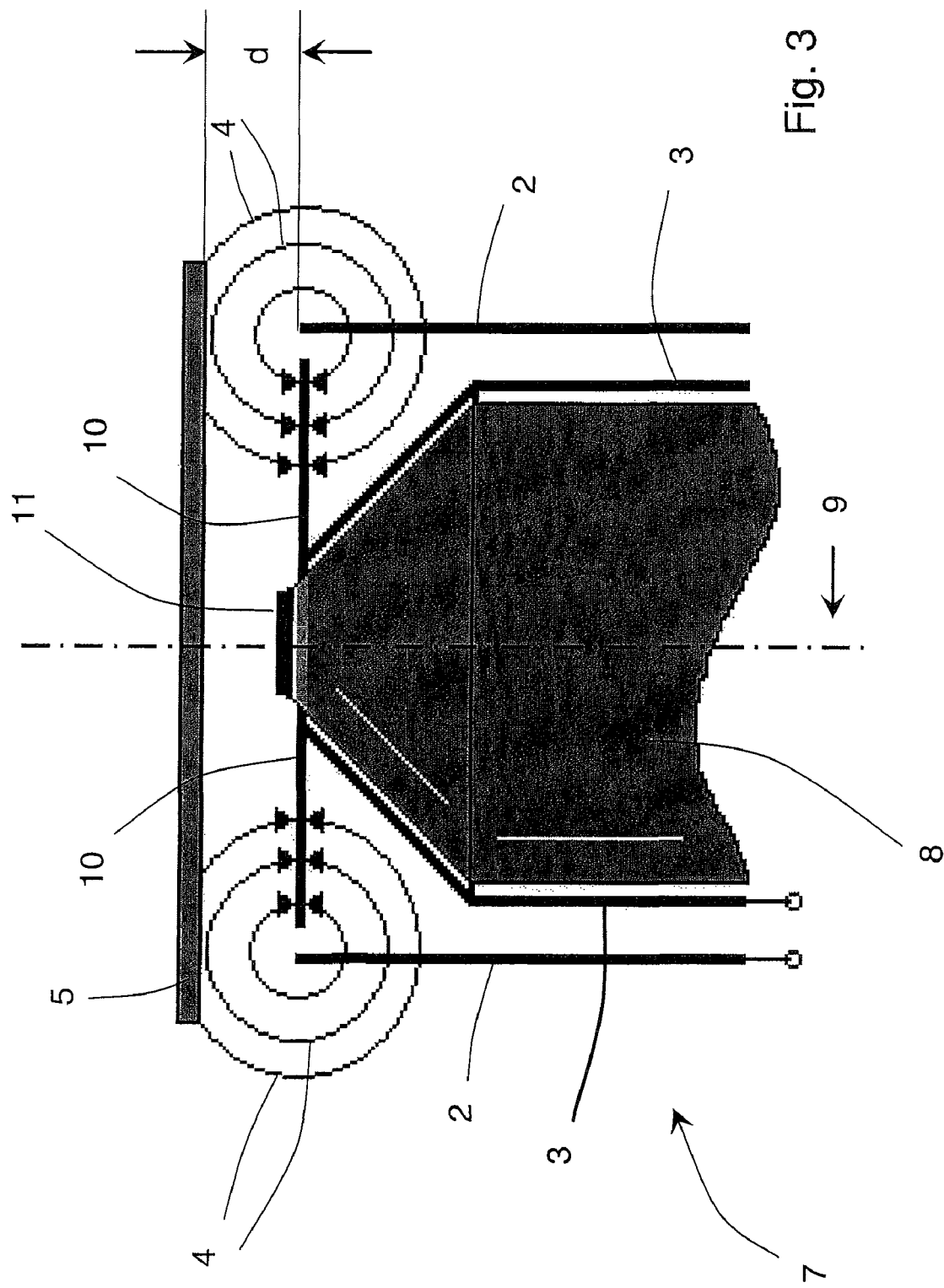
FIG. 3 shows a distance sensor plugged onto an objective in a fashion corresponding to the invention.

FIG. 3 shows the application of this functional principle to an inventive distance sensor which can be advantageously plugged onto an objective of a microscope. FIG. 3 shows a section through such a sensor, the sectional plane containing the optical axis 9 of the objective 8. The distance sensor 7 again has an outer electrode 2, which is configured as the lateral surface of a cylinder in this refinement of the sensor. The inner electrode 3 is essentially modeled on the shape of the objective 8, and touches the objective 8 in a form-fitting fashion, even if, for reasons of clarity, a small gap is shown between the objective 8 and outer electrode 3 in the drawing. In addition, the inner electrode 3 has a disc-shaped region 10, which is arranged substantially parallel to the object 5, i.e., the sample being examined or the microscope slide supporting the sample. In the region of the mid-point of the disc-shaped region 10, the objective 8 passes through the inner electrode 3 such that the objective lens 11 is not covered by the distance sensor 7. This ensures that it is possible to conduct microscopy, which includes parallel measurement of the distance.

An electric field, which likewise has components in the form of a stray field is formed between the electrodes 2 and 3. The field lines 4 of the stray field form between the electrode 2 and the disc-shaped region 10 of the electrode 3. If the object 5 now enters the measuring range of the sensor 7, that is to say if the electric field reaches the object 5 with an adequate field strength, a change in capacitance is set up as a function of the distance d of the objective from the object 5. If the object 5 includes a nonconductor, it will be an increase in the capacitance that is to be recorded as a consequence of the dielectric constant of the object 5, increased by comparison with the surroundings.

Figure 4:
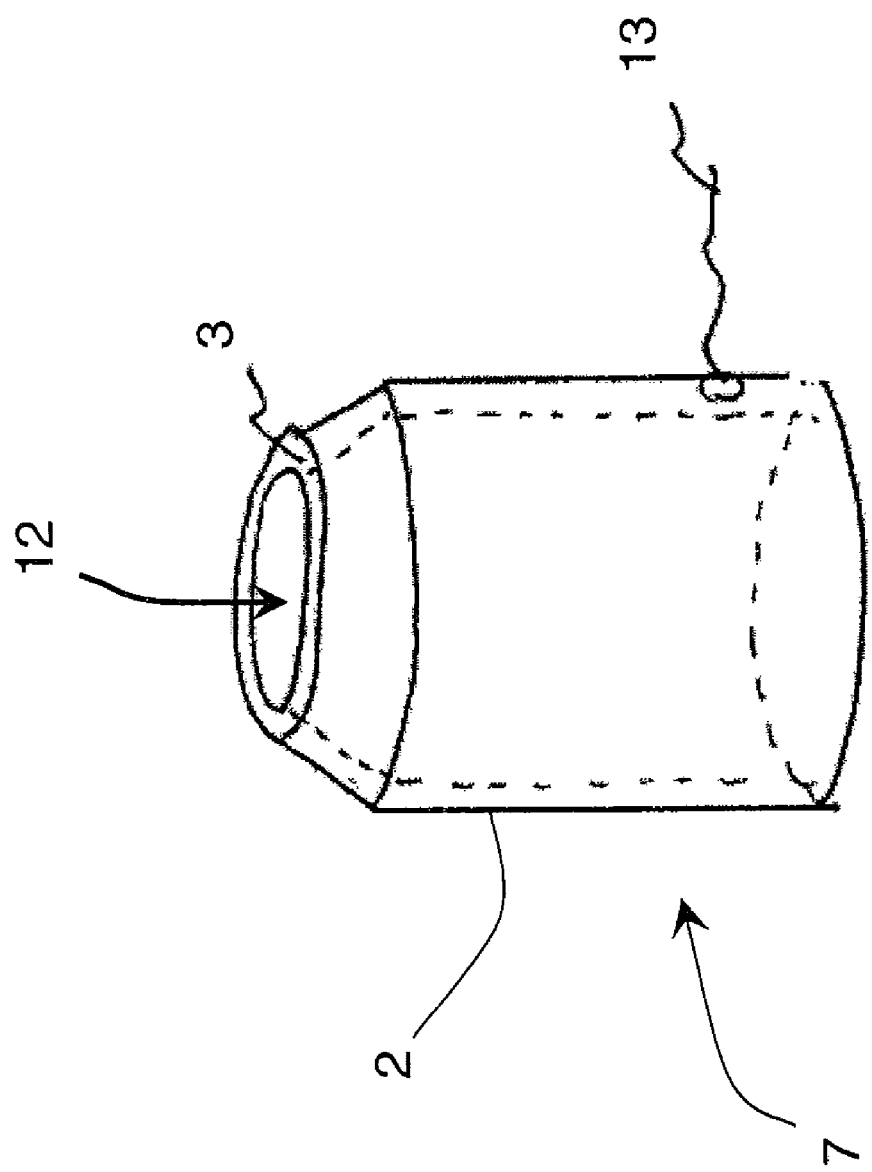
FIG. 4 shows an oblique view of a distance sensor similar to that in accordance with FIG. 3.

FIG. 4 shows such a distance sensor in a perspective illustration without the objective. However, both the outer electrode 2 and the inner electrode 3 are modeled on the shape of an objective 8 in the embodiment illustrated here. Consequently, the inner electrode 3 does not have a disc-shaped region 10. Nevertheless, the inner electrode 3 forms an opening 12, which provides the objective lens with free access to the light coming from the sample. Via a connecting cable 13, electrical energy is supplied to the sensor 7 and an evaluation of the capacitance of the sensor 7 is carried out.

Figure 5:
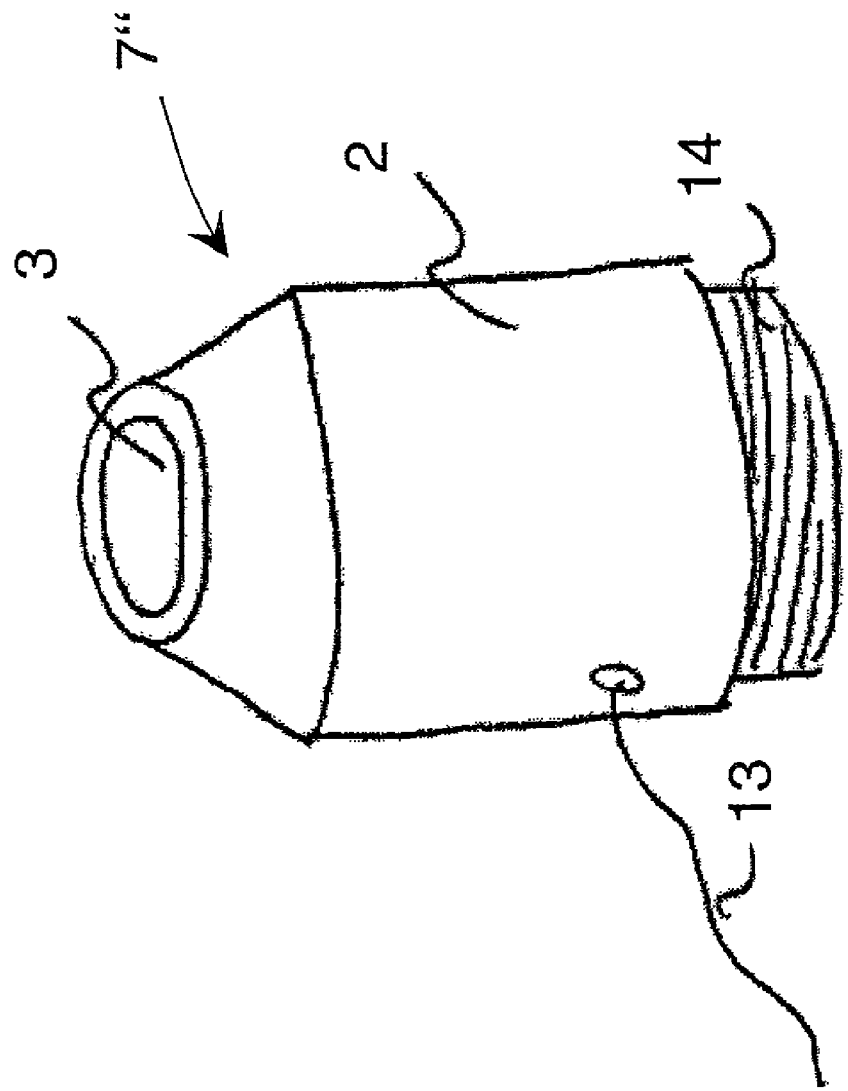
FIG. 5 shows an inventive distance sensor for screwing into an objective revolver of a microscope.

FIG. 5 illustrates a further refinement of an inventive distance sensor 7". Similarly to the distance sensor in accordance with FIG. 4, the distance sensor 7" has an outer and an inner electrode, which are modeled on the shape of an objective. However, the sensor 7" additionally has a threaded end 14 with which the sensor 7" can be screwed into an objective revolver of a microscope.

Figure 6:
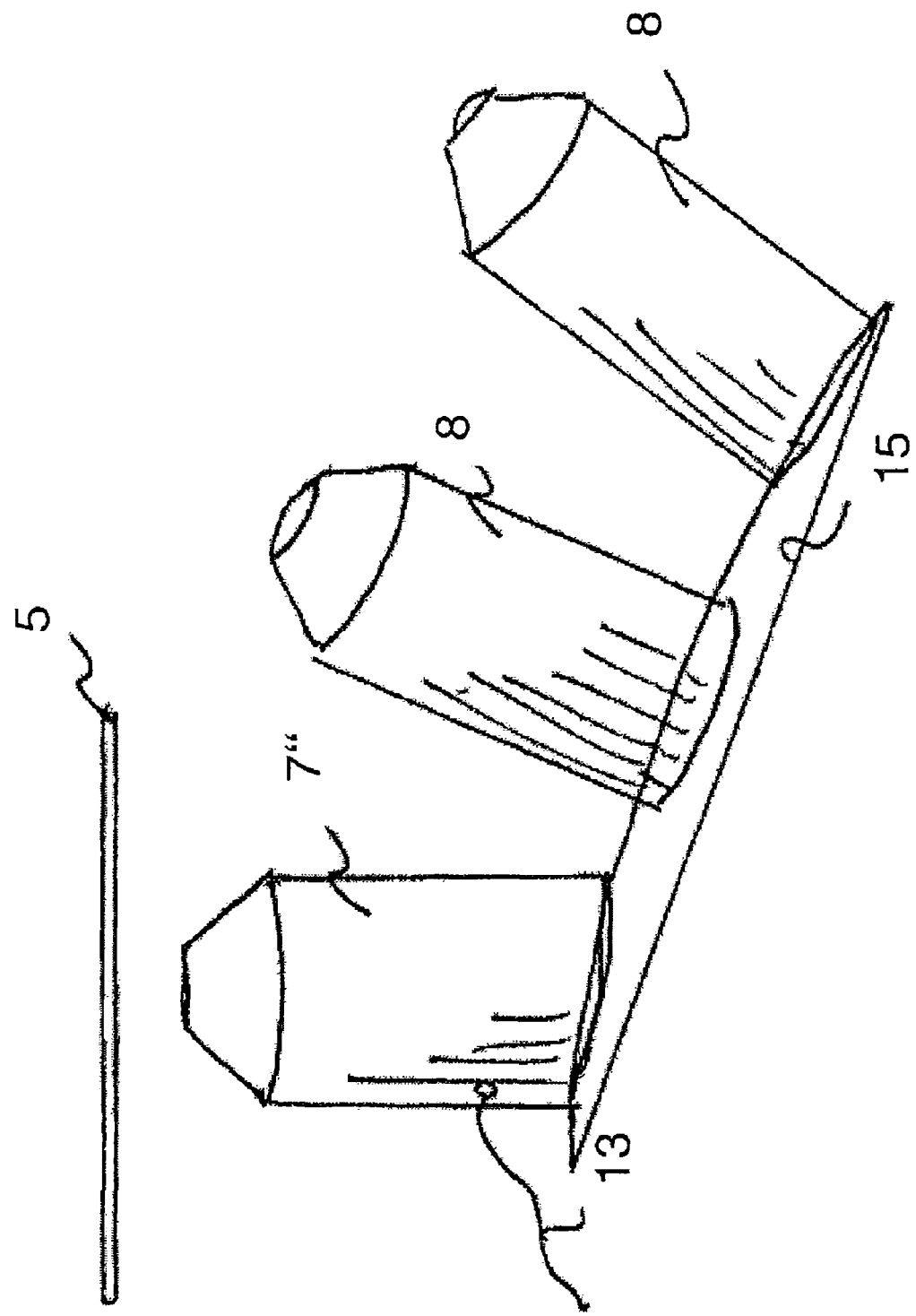
FIG. 6 shows the distance sensor in accordance with FIG. 5 and in the screwed-in state.

FIG. 6 shows the distance sensor 7" of FIG. 5 in a screwed-in state while it is directed towards an object 5 for the purpose of measuring the distance. In addition to the distance sensor 7", two objectives 8 are screwed into the objective revolver 15. If the distance between the sensor 7" and the object 5 is determined, the objective revolver 15 can be rotated in such a way that one of the objectives 8 is directed towards the object 5, and the object 5 can be viewed. This sensor, which can be screwed into the objective revolver, is suitable for an autofocus system but is, however, less suited for directly monitoring the microscopy operation in order to protect against destruction of the sample. It would be possible here only to determine once the distance between the sample 5 and the sensor 7", and then subsequently to track the changes in distance between the sample 5 and one of the objectives 8, and to calculate the actual distance therefrom. Nevertheless, it is thereby possible to determine comparatively accurate distance information, which is suitable for warning the operator of the microscope against too slight a distance.

Figure 7:
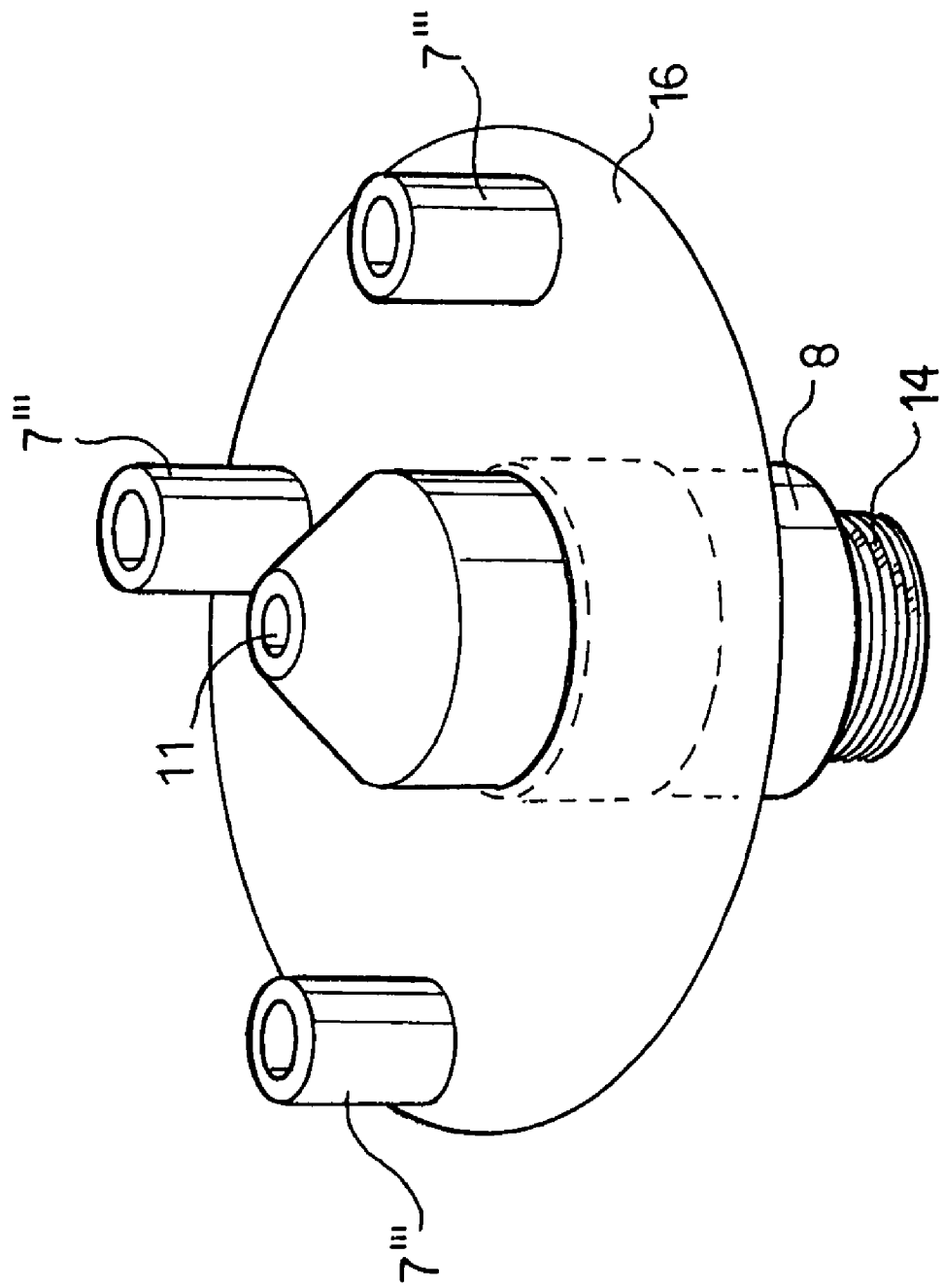
FIG. 7 shows an inventive arrangement having three sensors, which are connected to the objective via a disc as spacer.

A further refinement of the arrangement is illustrated in FIG. 7. A holding device 16 is fastened on an objective 8, which is provided with a thread 14 to be screwed into an objective revolver, and has an objective lens 11. The holding device 16 is configured as a disc and supports 3 distance sensors 7'''. The disc is ideally arranged such that the optical axis of the objective 8 is at right angles to the holding device 16. If the distance sensors 7''' are of identical configuration, it is possible in this way to determine the orientation of the sample 5 and of the object 8 relative to one another in addition to the distance of the objective 8 from the sample 5.

Figure 8:
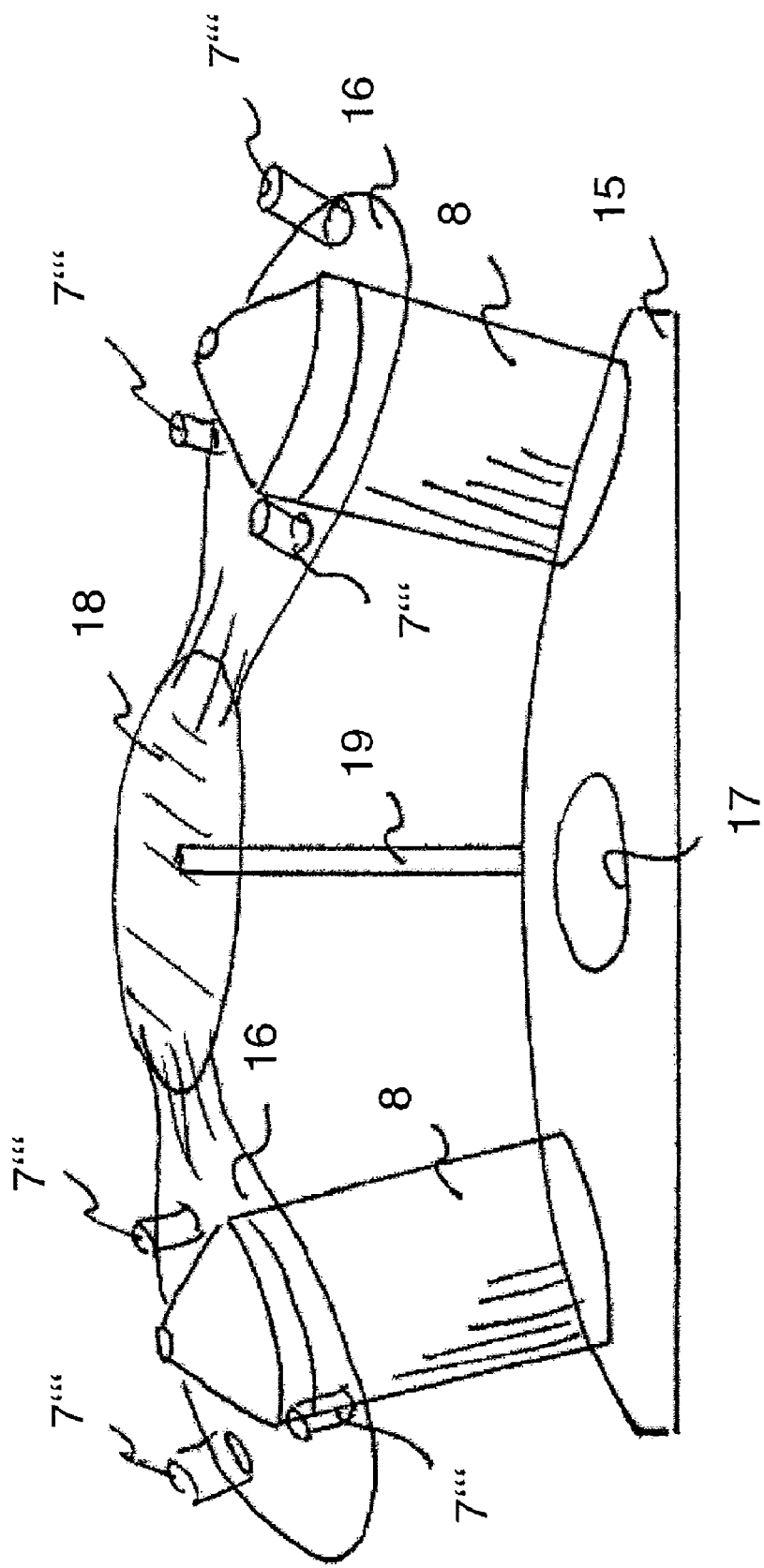
FIG. 8 shows an inventive arrangement having in each case three sensors per objective, the sensors being interconnected via a disc, and the discs being fastened on the objective revolver via a further holding device.

FIG. 8 shows such an arrangement in an installed state. The arrangement in accordance with FIG. 7 is present in a double embodiment and is screwed into an objective revolver 15. One of the holders 17 in the objective revolver remains empty in this case for illustrative purposes. However, this could likewise be fitted and have a sensor system like the other objectives. Both holding devices 16 illustrated are connected to a central unit 18 which is, in turn, connected to the objective revolver 15 via a fastening element 19. This central unit can fulfill a number of tasks. Firstly, it can serve the purpose purely of fixing or holding the holding devices with reference to the objective revolver 15. In this case, a holding device can also be fastened exclusively on the central unit and not on an objective. Secondly, it is possible to arrange in the central unit 18 an electronic circuit which carries out a measurement of the capacitance of the sensors 7''' and conditions the measured values for further evaluation and/or transmission. However, it would also already be possible here to undertake the evaluation of the measured values. The fastening element 19 could in this case serve not only to fasten the central unit 18, but also have lines which are used to transmit energy and data.

A further refinement of an inventive arrangement is illustrated in FIG. 9. An objective 8 having a thread 14 for screwing into an objective revolver, and an objective lens 11 is connected to a sensor 7''' via a holding device 16. Arranged around the objective 8 is a collar 20 on which, in turn, there is fastened a part of the holding device 16 with the aid of which the sensor 7''' is held at a distance from the objective lens 11. In a fashion similar to the case of the exemplary embodiments described above, it is also possible here for the holding device 16 or the collar 20 to be plugged onto the objective 8, bonded or welded thereto, secured with bayonet locks or the like, screwed onto the objective, crimped, or connected in any other way known from practice.

Figure 9B:
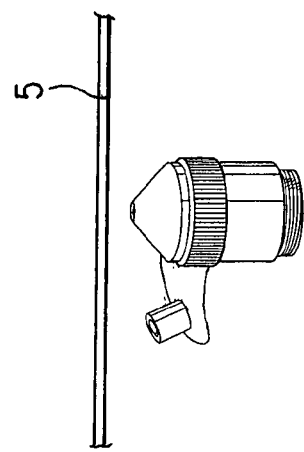
FIGS. 9a-9c show an inventive arrangement having a sensor fastened via a holding device.
Figure 9C:
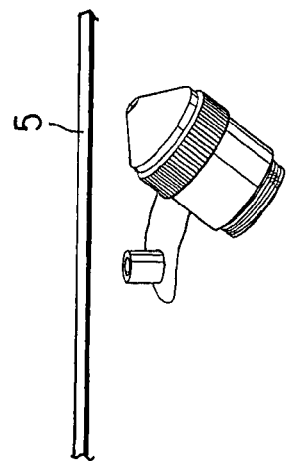
Figure 9A:
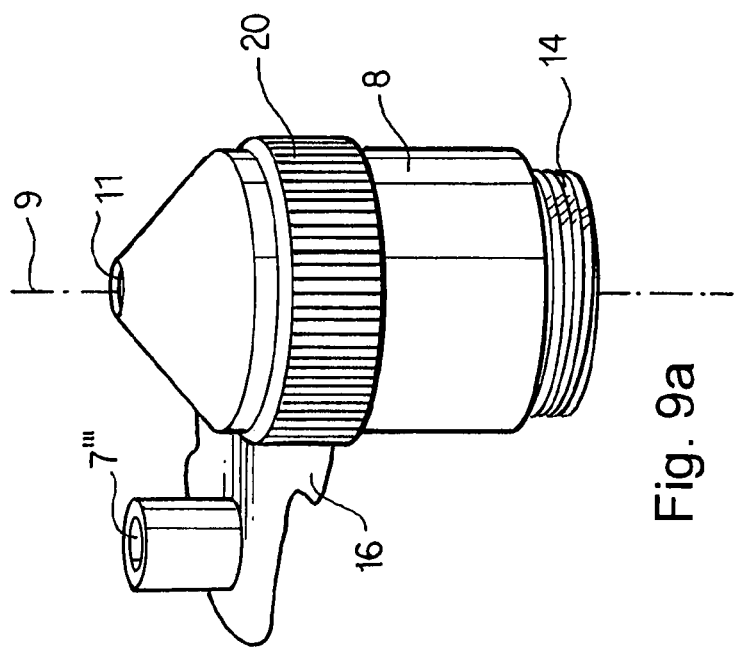

The arrangement illustrated in FIG. 9a can be operated in various ways. If the sensor 7''' is aligned parallel to the optical axis 9 of the objective 8, it is possible to measure and observe a slightly offset region of a sample located in front of the arrangement. If as illustrated in FIGS. 9b and 9c, the sensor 7''' is angled in relation to the optical axis 9 of the objective 8, the arrangement can be configured to be able to swivel into a measuring position and an observing position. FIG. 9b shows the arrangement in an observing position. The sample 5 can be subjected to microscopy in this way. If the arrangement is tilted into a measuring position, a distance measurement can be carried out at substantially the same position of the sample 5. A reliable distance measurement can be carried out in this way even in the case of samples of very irregular height.

Figure 10:
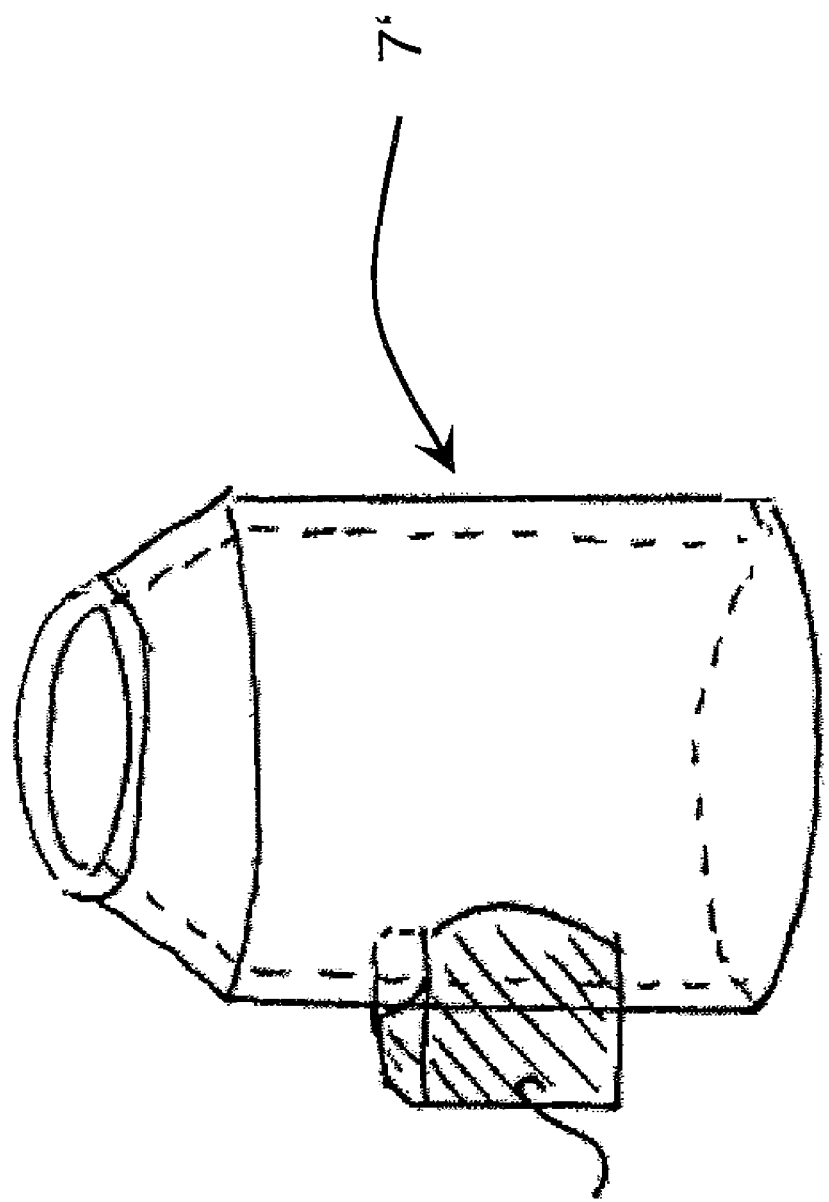
FIG. 10 shows the sensor in accordance with FIG. 4, on which an electronic unit for carrying out the measurement and for transmitting the measured values via a wireless connection is additionally fitted.

FIG. 10 shows a distance sensor 7' in accordance with FIG. 4, on which an electronic unit 21 is additionally fastened. The electronic unit 21 includes an electronic circuit which can carry out a measurement of the capacitance and suitably condition the measured values. It is possible here, in turn, already to carry out first evaluations of the measured values such as, for example, a comparison with a reference value, linearizations or the like. At the same time, the electronic unit 21 can condition the measured values or the evaluated measured values for transmission to a further unit, and transmit them to this unit using a method with or without cables.

Figure 11:
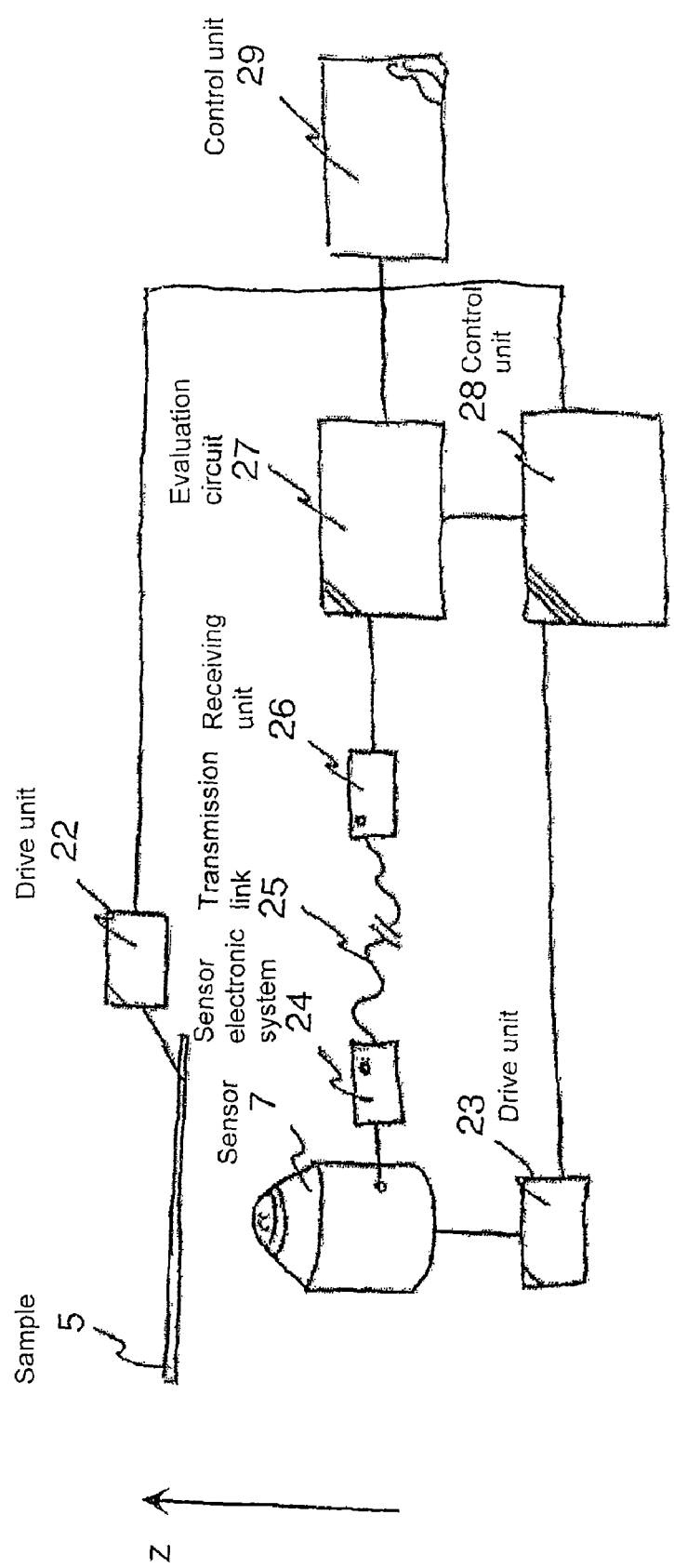
FIG. 11 shows an electronic circuit for operating an inventive arrangement.

FIG. 11 illustrates a circuit which is suitable for operating the inventive arrangement and for carrying out the inventive method. A distance sensor 7 is directed towards a sample 5, it thereby being possible to determine the distance between the sensor 7 and the sample 5. In order to vary the distance, the sample is connected along the z-direction to a suitable drive unit 22. In general, this drive unit 22 will be the adjustment drive for the microscope stage, which supports the sample 5 or the microscope slide supporting the sample. Alternatively, or in addition, the sensor can be moved in, or against the z-direction. This can be performed, for example by moving the objective revolver with the aid of drive unit 23, as a result of which the objective screwed into the objective revolver and supporting the sensor is also moved.

The sensor 7 is connected to a sensor electronic system 24 which is, in turn, connected to a receiving unit 26 via a transmission link 25. The three components (24, 25, 26) can be configured in various ways. Thus, the sensor electronic system 24 can carry out a measurement of the capacitance of the sensor 7, prepare the measured values for wireless transmission, and transmit them to the receiving unit 26 via a radio transmission link 25. Alternatively, the sensor electronic system 24 could be eliminated, and the transmission link 25 could be formed by a coaxial cable. The receiving unit 26 would in this case be a unit which simultaneously carries out the supply of energy to the sensor 7 and measures the capacitance of the sensor 7. Further configurations of such connections are efficiently known from practice and obvious to a person skilled in the art.

The receiving unit 26 is connected to an evaluation circuit 27. The evaluation circuit 27 assigns the determined capacitance value to a distance value between the sensor and sample. This is generally performed via assignment rules known from practice. These assignment rules can be implemented in the form of tables, something which can be implemented with particular ease, especially for an evaluation circuit in the form of a digital computer. Capacitance values between stored values could be suitably interpolated. Alternatively, the assignment between capacitance values and distance value could be suitably calculated by the evaluation circuit. The evaluation circuit could additionally carry out a digital or analog linearization and eliminate nonlinear measuring effects.

The evaluation circuit 27 additionally generates control signals, which can be used to address a control unit 28. This control unit 28 drives the drive unit 22 and/or the drive unit 23 in a suitable way to vary the distance between the sensor 7 and sample 5.

In addition, the evaluation circuit 27 can be connected to an external control unit 29. This control unit 29 can be used, for example, in order to input into the evaluation circuit 27 knowledge relating to the sample 5. However, this control unit 29 can also serve the purpose of visualizing the determined distance values to the user, or of outputting warning notices to the user. The control unit 29 can be implemented in various ways. For example, reference may be made to the use of a personal computer, a PDA (Personal Digital Assistant), a SmartPhone or special hardware.

It may be stressed very particularly in conclusion that the exemplary embodiments previously selected purely arbitrarily serve merely for explaining the inventive teaching but do not confine the latter to the exemplary embodiments.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A capacitive distance sensor for use with an objective of a microscope, comprising:
   at least two electrodes between which a stray field is generated, wherein a capacitance of the capacitive distance sensor experiences a measurable change when an object is introduced into the stray field between the at least two electrodes;
   wherein portions of the electrodes are arranged as substantially coaxial lateral surfaces, at least one of the substantially coaxial lateral surfaces being operatively configured to at least partially enclose and touch the objective of the microscope, and to allow the sensor to be plugged onto the objective of the microscope.

2. The sensor according to claim 1, wherein one of the at least two electrodes arranged nearest and touching the objective is shaped to correspond with at least a portion of the objective.

3. The sensor according to claim 2, wherein the one of the at least two electrodes arranged nearest and touching the objective touches the objective in a form-fitting manner.

4. The sensor according to claim 1, further comprising a nonconductive material fitted on one edge of the at least two electrodes for protecting against soiling.

5. The sensor according to claim 1, further comprising a dielectric arranged in between the at least two electrodes.

6. The sensor according to claim 1, wherein the at least two electrodes are operatively configured to generate the stray field primarily in a region around an optical axis of the objective.

* * * * *